United States Patent [19]

Nomura et al.

[11] 4,300,278
[45] Nov. 17, 1981

[54] TOOL EXCHANGER FOR A MACHINE TOOL

[75] Inventors: Kenji Nomura, Aichi; Akira Tsuboi, Kariya; Kunimichi Nakashima, Anjoh, all of Japan

[73] Assignee: Toyoda Koki Kabushiki Kaisha, Kariya, Japan

[21] Appl. No.: 88,154

[22] Filed: Oct. 25, 1979

[30] Foreign Application Priority Data

Oct. 27, 1978 [JP] Japan .............................. 53-132932

[51] Int. Cl.³ .......................................... B23Q 3/157
[52] U.S. Cl. .................................... 29/568; 408/35; 414/783
[58] Field of Search ....................... 29/568; 408/35; 414/776, 779, 783

[56] References Cited

U.S. PATENT DOCUMENTS

| | | | |
|---|---|---|---|
| 3,217,406 | 11/1965 | Dever | 29/568 |
| 3,218,706 | 11/1965 | Zankl et al. | 29/568 |
| 3,286,344 | 11/1966 | Brainard et al. | 29/568 |
| 3,516,149 | 6/1970 | Mickas | 29/568 |
| 3,947,951 | 4/1976 | Jerue | 29/568 |
| 4,126,233 | 11/1978 | Jeske | 29/568 X |

FOREIGN PATENT DOCUMENTS

| | | | |
|---|---|---|---|
| 1652699 | 6/1978 | Fed. Rep. of Germany | 29/568 |
| 2847683 | 5/1979 | Fed. Rep. of Germany | 29/58 |
| 137676 | 9/1979 | German Democratic Rep. | 29/568 |
| 197705 | 5/1977 | U.S.S.R. | 29/568 |
| 614940 | 6/1978 | U.S.S.R. | 29/568 |

*Primary Examiner*—William R. Briggs
*Attorney, Agent, or Firm*—Oblon, Fisher, Spivak, McClelland & Maier

[57] ABSTRACT

A tool exchanger wherein an exchange arm fixed on one end of a rotatable and axially slidable shaft is formed with a pair of semi-circular openings at opposite ends thereof. A pair of gripping plungers slidably received in the exchange arm are spring-biased toward opposite ends of the arm for gripping tools held in the semi-circular openings. A pair of guided pins are protruded respectively from the gripping plungers. A cam engageable with the guided pins is disposed in position to inwardly retract either of the gripping plungers which approaches a tool socket of a tool magazine, against the force of an associated bias spring, when the exchange arm is pivoted from a parked position toward a grip position for gripping tools received respectively in a machine tool spindle and the tool socket.

6 Claims, 5 Drawing Figures

TOOL EXCHANGER FOR A MACHINE TOOL

BACKGROUND OF THE INVENTION

1. Field of the Invention

The present invention relates to a tool exchanger for exchanging tools between a machine tool spindle and a tool magazine.

2. Description of the Prior Art

In a typical tool exchanger, as disclosed in U.S. Pat. No. 3,218,706 to Zankl et al., there is provided an exchange arm which is rotatable about and slidable along an axis for exchanging the tool between a machine tool spindle and a tool magazine. The exchange arm is formed with a pair of semi-circular openings at opposite ends thereof and slidably carries therein a pair of gripping plungers, which are spring-biased toward the opposite ends of the exchange arm for gripping tools held in the semi-circular openings. The gripping plungers are forced by the tools to be retracted inwardly of the exchange arm at the time when the exchange arm is pivoted in one direction around a tool grip position and when the exchange arm is pivoted in the other direction from a gripped position to a parked position.

The force that effects such inward retraction movements of the gripping plungers typically counteracts the tools. In the case where the tool magazine used with the tool exchanger is of a chain type wherein tools are customarily stored in tool sockets carried on a chain, such counteraction force causes the tool at a tool exchange station to be displaced therefrom due to the presence of looseness in the chain, thus obstructing smooth and exact tool gripping.

SUMMARY OF THE INVENTION

Accordingly, it is a principle object of the present invention to provide an improved tool exchanger having an exchange arm which is capable of gripping a tool positioned at an exchange station without applying any unnecessary force to the tool.

Another object of the present invention is to provide an improved tool exchanger wherein an arrangement is provided to retract either of the spring-biased gripping plungers which approach an exchange station, inwardly of the exchange arm, when the same is pivotably moved from a parked position toward the exchange station for tool gripping.

A further object of the present invention is to provide an improved tool exchanger of the character set forth above which is particularly suitable for use with a chain type tool magazine.

Briefly, these and other objects are achieved by the present invention through the provision of a tool exchanger, which comprises an arm shaft carried on an exchanger base for rotational and axial movement and an exchange arm fixedly mounted at a middle portion thereof on the arm shaft and extending perpendicular to the same, the exchange arm having formed at opposite ends thereof a pair of semi-circular openings for holding tools. Also included are a first drive device connected to the arm shaft for axially moving the same to thereby remove at least one of the tools held by the exchange arm and insert the tool into a machine tool spindle; a second drive device connected to the arm shaft for rotating the same to thereby bring one of the tools held by the exchange arm into axial alignment with said tool spindle; a pair of gripping plungers received in the exchange arm for sliding movement in a radial direction of the arm shaft; biasing means interposed between the exchange arm and the gripping plungers for respectively urging the same to outwardly extend so as to thereby grip the tools held in the semi-circular openings; and a locking mechanism provided in the exchange arm and movable between first and second positions to respectively permit and inhibit the inward retraction movements of the gripping plungers.

The tool exchanger is further provided with a plunger control mechanism which is arranged to retract at least one of the gripping plungers inwardly of the exchange arm against the force of the biasing means when the locking mechanism is in the first position. Accordingly, the exchange arm is able to grip a tool at, for example, an exchange station without applying any unnecessary force to the tool, and this makes it possible to prevent the tool at the exchange station from being displaced therefrom due to the presence of the looseness in a chain even in the case where the tool exchanger is employed together with a chain type tool magazine, thereby achieving smooth and exact tool gripping.

In another aspect of the present invention, the plunger control mechanism is constructed of a pair of pin members respectively protruding from the gripping plungers and a cam disposed in position to guide at least one of the pin members to thereby inwardly retract one of the gripping plungers when the exchange arm is pivoted toward a tool grip position in one direction. Accordingly, the reliability of the plunger control function of the mechanism can be greatly enhanced.

BRIEF DESCRIPTION OF THE DRAWINGS

Various other objects, features and attendant advantages of the present invention will readily be appreciated as the same becomes better understood by reference to the following detailed description of preferred embodiments when considered in connection with the accompanying drawings, wherein like reference numerals designate like or corresponding parts throughout the several views, and in which.

DETAILED DESCRIPTION OF THE PREFERRED EMBODIMENTS

Figure 1:
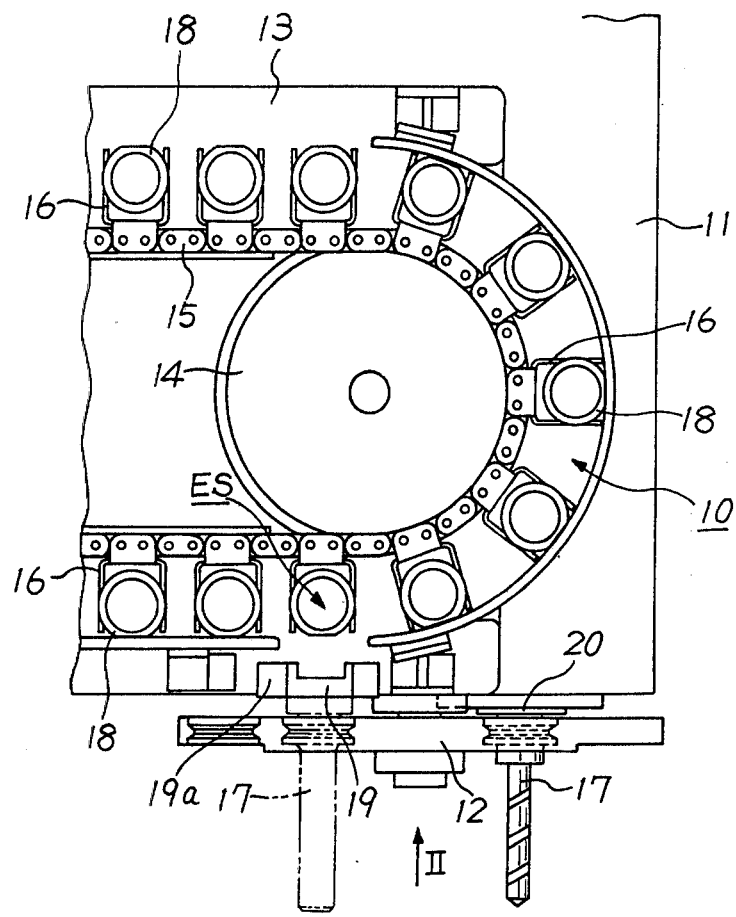
FIG. 1 is a side elevational view of a portion of a machine tool with a tool exchanger according to the present invention.

Referring now to the drawings and more particularly to FIG. 1 thereof, a tool magazine, a machine tool spindle head and an exchange arm are shown being respectively designated by reference numerals 10-12. A base 13 of the magazine 10 is mounted on a lateral surface of a machine tool column, not shown, slidably guiding the spindle head 11 in a vertical direction. An endless chain 15 is wound round a drive sprocket 14 and a following wheel, not shown, both of which are rotatably mounted on the magazine base 13. The chain 15 has carried thereon at regular intervals a plurality of socket supports 16, by which are respectively pivotably carried a plurality of tool sockets 18 for removably receiving diverse tools 17. For convenience, the tools being inserted into the tool sockets 18 are all omitted from illustration in FIG. 1. The tool sockets 18 are usually held horizontal and are selectively indexable to an exchange station ES in a usual manner. Each tool socket 18 indexed to the exchange station ES is moved from a horizontal position to a vertical position when pivoted through an angle of 90 degrees by the action of a suitable upsetting mechanism, not shown. A locating plate 19 fixed on the magazine base 13 is formed with a horizontally extending locating portion 19a, as best shown in FIG. 2, which snugly receives each tool socket 18, pivoted at the exchange station ES, to thereby assure the precise vertical position of the tool socket 18.

The spindle head 11 carries a tool spindle 20 for rotation about a vertical axis. The lowermost end of the tool spindle 20 is adapted to removably receive each tool 17. The exchanger arm 12 is provided for exchanging tools between the tool socket 18 pivoted at the exchange station ES and the tool spindle 20.

Figure 2:
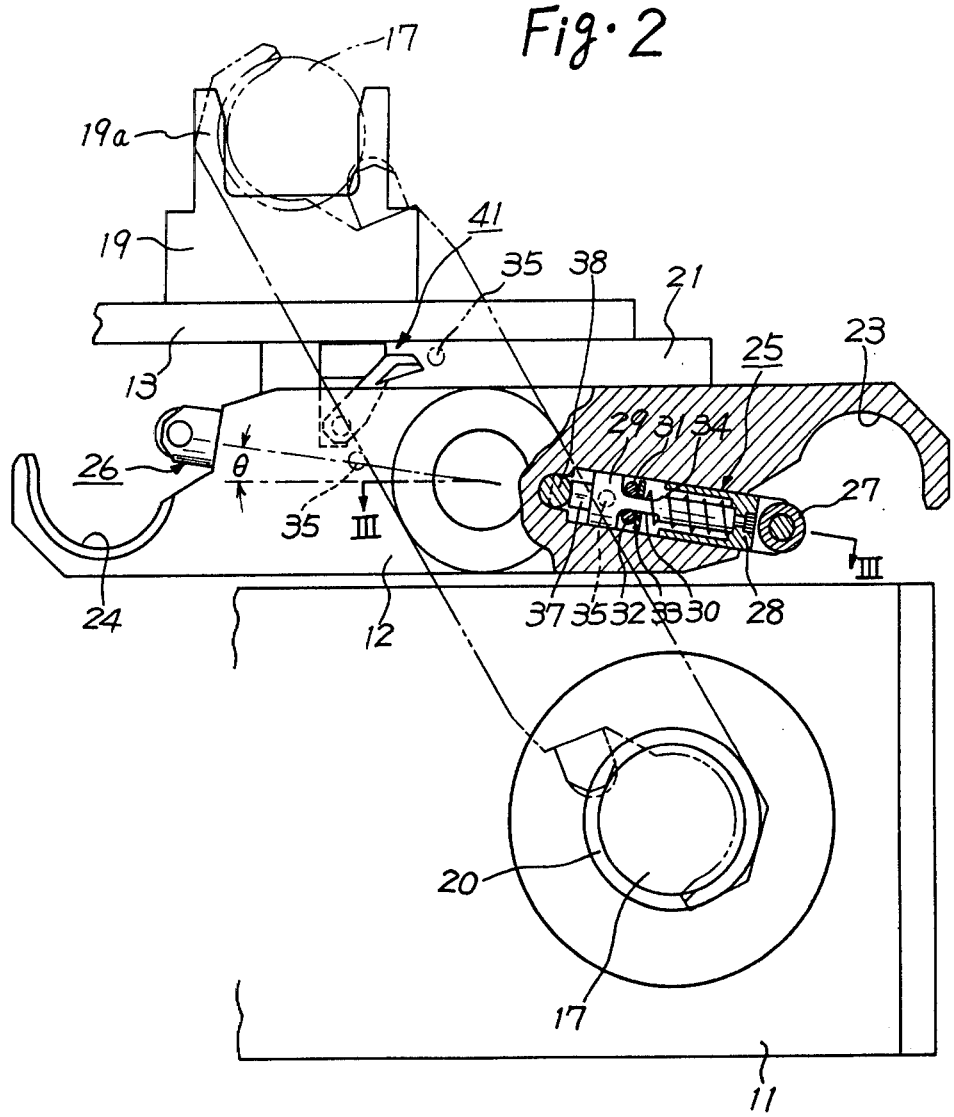
FIG. 2 is a partial enlarged view of the machine tool as viewed from the direction indicated by the arrow II of FIG. 1.
Figure 3:
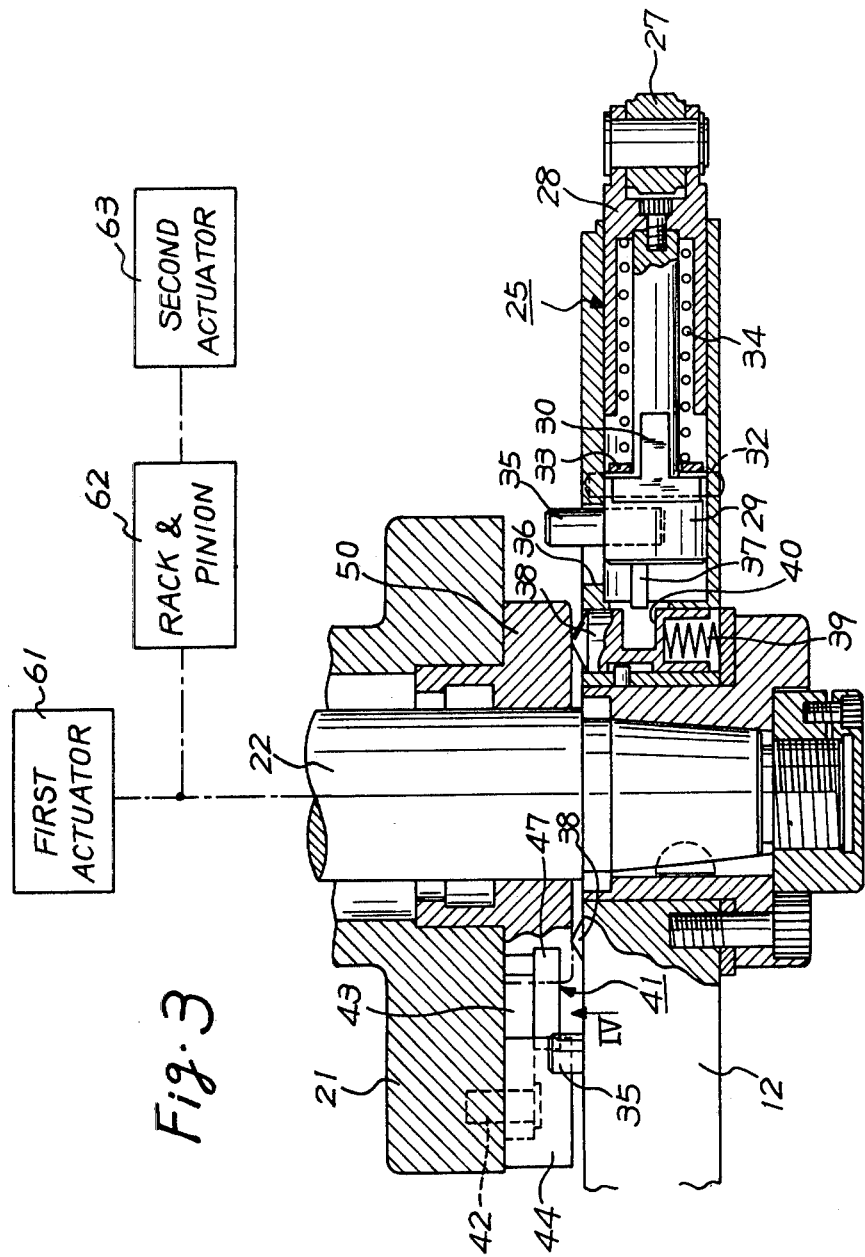
FIG. 3 is an enlarged sectional view of the tool exchanger taken along the line III—III of FIG. 2.

Referring now to FIGS. 2 and 3, there is illustrated an exchanger base 21, which is fixedly mounted upon a back surface of the magazine base 13. An arm shaft 22, which extends vertically and in parallel relation with the axis of the tool spindle 20, is carried within the exchanger base 21 through a bearing member 50 for rotational and axial movements. The exchange arm 12 is keyed at a middle portion thereof on a lowermost end of the arm shaft 22, thus extending in a perpendicular direction to the arm shaft, and is formed with a pair of semi-circular openings 23 and 24 at opposite ends thereof. A pair of gripping rods or plungers 25 and 26 are received in the exchange arm 12 for axial sliding movement along the line that, on the axis of the arm shaft 22, intersects with a predetermined acute angle $\theta$ the line passing through the centers of the semi-circular openings 23 and 24. The gripping plungers 25 and 26 are of the same construction, and therefore, description will be made with respect to the plunger 25.

As best shown in FIG. 3, the plunger 25 is composed of a sleeve member 28 rotatably carrying at an outer end thereof a grip roll 27, which is engageable with each tool 17 received in the grip opening 23, and a rod member 29 connected to the sleeve member 28 in coaxial alignment therewith. The rod member 29 has formed at its middle flattened parallel portions 30, which are guided by a pair of pins 31 and 32 embedded in the exchange arm 12. The pins 31 and 32 act to restrict the rotation of the gripping plunger 25 as well as to limit the outer limit of the axial sliding movement of the plunger 25. A spring shoe 33, permitting the loose insertion of the rod member 29 thereinto, is seated on the pins 31 and 32, and a compression spring 34 is interposed between the spring shoe 33 and the sleeve member 28. This spring 34 serves to urge the sleeve member 28 and the rod member 29, that is, the gripping plunger 25, to move in the outward direction of the exchange arm 12 until the position where the rod member 29 comes into contact with the pins 31 and 32. It will therefore be apparent that the pins 31 and 32 have three functions: the function of restricting the rotation of the plunger 25, the function of supporting the spring 34 and the function of limiting the extending movement of the outer end of the plunger 25.

Protruded from the rod member 29 in a radial direction thereof is a guided pin 35, whose outer end passes through an elongate slot 36 formed on the exchange arm 12 so as to thereby be protruded from the inside surface of the exchange arm 12. The rod member 29 has also protruded from an inner end thereof an engaging piece 37, which extends toward the middle portion of the exchange arm 12.

In the exchange arm 12, there is further received a locking plunger 38, which is permitted to move only in a direction parallel to the axis of the arm shaft 22. A compression spring 39 is interposed between the exchange arm 12 and the plunger 38 to thereby urge the plunger 38 to protrude a limited distance from the inside surface of the exchange arm 12. The plunger 38 is formed with a cutout 40 at a part thereof facing the engaging piece 37. The locking plunger 38 is in abuttable relation with an outer end surface of the bearing member 50 and is withdrawn into the exchange arm 12 when the same is upwardly retracted to a retracted position, as viewed in FIG. 3, in the axial direction of the arm shaft 22. The locking plunger 38, when so withdrawn, presents the cutout 40 in alignment with the engaging piece 37, and this permits the inward retraction movement of the gripping plunger 25. On the other hand, as the exchange arm 12 is downwardly extended in the axial direction of the arm shaft 22, the locking plunger 38 is moved by the force of the spring 39 relative to the exchange arm 12. This causes the locking plunger 38 to present a part of its cylindrical surface in abuttable relation with the engaging piece 37 to thereby inhibit the inward retraction movement of the gripping plunger 25.

Figure 4:
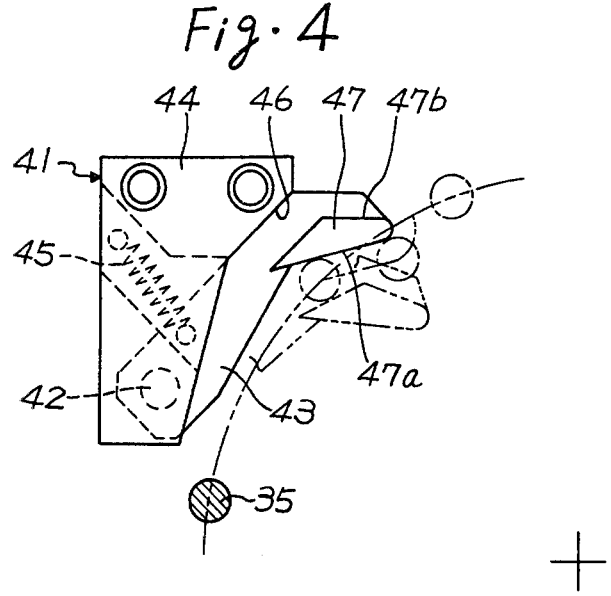
FIG. 4 is a front view of a plunger control mechanism of the tool exchanger as viewed from the direction indicated by the arrow IV of FIG. 3.

On an under surface of the exchanger base 21, there is mounted a plunger control mechanism 41 for controlling the sliding movement of either gripping plunger 25 or 26 when the same approaches to the exchange station ES for tool gripping. As best shown in FIGS. 3 and 4, the mechanism 41 comprises a base block 44 fixed on the exchanger base 21 and a cam lever 43 carried on the base block 44 for pivotal movement about a hinge pin 42 which is provided in parallel relation with the axis of the arm shaft 22. A tension spring 45 is interposed between the base block 44 and the cam lever 43 to thereby hold the cam lever 43 in such an angular position as to contact with a stop surface 46 formed on the base block 44. The cam lever 43 is integrally formed with a guide cam 47, which is protruded onto the locus that the guided pin 35 of either gripping plunger 25 or 26 draws when the same is pivotally moved toward the exchange station ES. The guide cam 47 is almost triangular in section as taken along the plane perpendicular to the axis of the hinge pin 42. The primary function of the guide cam 47 is to move the guided pin 35 to thereby inwardly retract against the force of the spring 34 either gripping plunger 25 or 26 which is moved toward the exchange station ES when the exchange arm 12 is pivoted from the parked position as indicated by the solid line in FIG. 2 toward the grip position as indicated by the phantom line and also to release the guided pin 35 from such guided movement when the exchange arm 12 reaches the grip position. Accordingly, when the exchange arm 12 at the upwardly withdrawn position is pivoted toward the grip position, either gripping plunger 25 or 26 which advances toward the exchange station ES is inwardly retracted immediately before the grip position and is outwardly extended at the grip position to thereby firmly grip a tool 17 at the exchange station ES in cooperation with the portion of the exchange arm 12 which defines the associated gripping opening 23 or 24. This makes it possible to reliably grip the tool 17 at the exchange station even in the presence of the loosening of the magazine chain 15.

Referring now to FIG. 3, there are also illustrated in block form a first actuator 61 for axially moving the arm shaft 22, a rack and pinion mechanism 62 and a second actuator 63 for pivotally moving the arm shaft 22 through the rack and pinion mechanism 62. The second actuator 63 is composed of, for example, a two-step-motion hydraulic cylinder, which acts to selectively impart an almost 60 degree pivotal approach movement and a 180 degree pivotal transfer movement to the arm shaft 22. Drive devices 61 and 63 are well known to those skilled in the art and further detailed description of these drive devices 61 to 63 is omitted only for the sake of brevity.

The operation of the apparatus as constructed above will be described hereafter. While a machining operation is performed with a tool 17 received in the tool spindle 20, the magazine chain 15 is indexed to position at the exchange station ES the tool socket 18 that holds a fresh tool 17 to be next used. Upon completion of the machining operation using the old tool 17, the spindle head 11 is upwardly returned to its elevated home position, as shown in FIG. 1, for tool exchange, and the tool socket 18 having been indexed to the exchange station ES is then pivotally moved by the actuation of the upsetting mechanism, not shown, from the horizontal position to the vertical position through an angle of 90 degrees.

Following this, the exchange arm 12 is pivoted by the actuation of the second actuator 63 through an angle of almost 60 degrees in a clockwise direction as viewed in FIG. 2 which causes the respective pairs of the grip openings 23 and 24 and the gripping plungers 25 and 26, provided at the opposite ends thereof, to simultaneously grip the old and fresh tools 17 and 17 received respectively in the tool spindle 20 and the pivoted tool socket 18. One of the gripping plungers in this pivotal approach movement, for example plunger 25, is brought into abutting engagement with the old tool 17 received in the tool spindle 20 and is inwardly retracted by the old tool 17 against the force of the spring 34 so as to thereby permit the receiving of the old tool 17 in the associated grip opening 23. On the other hand, the other gripping plunger 26 in this pivotal approach movement is gradually inwardly retracted against the force of the spring 34 as a result of the guided pin 35 being guided along a front cam surface 47a of the guide cam 47 when the exchange arm 12 is pivoted to the vicinity of the grip position and causes the grip roll 27, carried at its outer end, to pass by the fresh tool 17. At the end of the pivotal approach movement of the exchange arm 12, disengagement of the guided pin 35 from the guide cam 47 is effected whereby the gripping plunger 26 is outwardly extended by the force of the spring 34 to thereby grip the fresh tool 17 in cooperation with the arm end portion defining the associated grip opening 24. It is therefore possible for the exchange arm 12 to reliably grip the fresh tool 17 at the exchange station ES without applying any force to the pivoted tool socket 18 and accordingly, without displacing the same even with the loosening of the magazine chain 15.

When the simultaneous grippings of the tools 17 are completed as mentioned above, the exchange arm 12 is downwardly extended to thereby remove the tools 17 respectively from the tool spindle 20 and the tool socket 18. The second actuator 63 is then operated to impart a 180 degree pivotal transfer movement (in a counter-clockwise direction as viewed in FIG. 2) to the arm shaft 22, namely to the exchange arm 12 through the rack and pinion mechanism 62. The downward extension movement of the exchange arm 12 permits the locking plungers 38 to be protruded by the force of the springs 39 from the inside surface of the exchange arm 12 so as to thereby inhibit the inward retraction movements of the gripping plungers 25 and 26. Accordingly, during the transfer movement, the tools 17 are prevented from falling off due to the inward retractions of the gripping plungers 25 and 26.

Upon completion of the 180 degree pivotal transfer movement, the exchange arm 12 is upwardly withdrawn by the reverse action of the first actuator 61, and the old tool 17 and the fresh tool 17 are inserted respectively into the pivoted tool socket 18 and the tool spindle 20. This upward withdrawal of the exchange arm 12 brings the locking plungers 38 into abutting engagement with the bearing member 50. The locking plungers 38 are depressed into the exchange arm 12 and present their cutouts 40 respectively into alignment with the engaging pieces 37 so as to make the inward retraction movements of the gripping plungers 25 and 26 possible. The upward withdrawal of the exchange arm 12 further causes the guided pin 35 of the gripping plunger 25 to be brought into engageable relation with the guide cam 47.

With the second actuator 63 subsequently operated, the exchange arm 12 is pivoted through an angle of almost 60 degrees in a counterclockwise direction as viewed in FIG. 2 and thus, is returned to the parked position. The guided pin 35 in the return movement of the exchange arm 12 is pivotally moved along a back cam surface 47b of the guide cam 47. This causes the cam lever 43 to be pivotally shunted against the force of the spring 45 as indicated by the phantom line in FIG. 4, and the guided pin 35 is released from the positive guidance of the cam lever 43. Consequently, the gripping plungers 25 and 26 are positively depressed by the old and fresh tools 17 at an early stage of the returning of the exchange arm 12 to the parked position. It is noted herein that the positive depression of the gripping plunger 25 by the old tool 17 received in the tool socket 18 does not raise any problem because the force that is applied to the tool socket 18 when the gripping plunger 25 releases the tool 17 is all received by the locating plate 19 and is not applied to the magazine chain 15.

Figure 5:
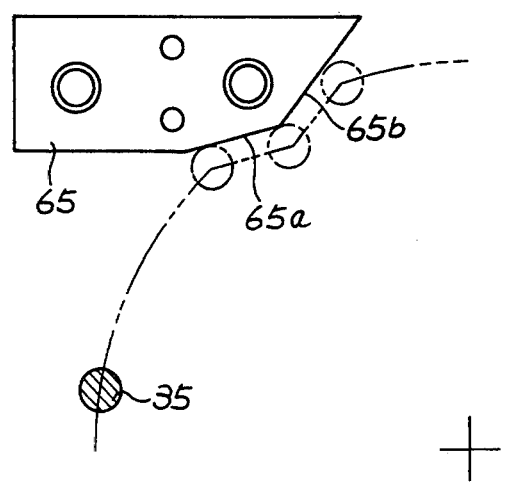
FIG. 5 is a front view of a cam plate used in place of the plunger control mechanism.

FIG. 5 is illustrative of a plunger control stationary cam plate 65 which is employed in place of the above-noted plunger control mechanism 41. This cam plate 65 is fixed upon the under surface of the exchanger base 21 and is formed with a second cam surface 65b in addition to a first cam surface 65a which corresponds in function to the front cam surface 47a of the above-noted guide cam 47. The second cam surface 65b serves to inwardly retract either gripping plunger 25 or 26 which is about to release the old tool 17 received in the tool socket 18 when the exchange arm 12 is pivotally returned toward the parked position. That is, the stationary cam plate 65 serves to control the axial movement of either the gripping plungers 25 and 26 in both the pivotal approach and return movements of the exchange arm 12 and therefore, is particularly advantageous in the case where a socket positioning and holding member such as the above-noted locating plate 19 is not provided at the exchange station ES.

Although the axial movement control of the gripping plungers 25 and 26 synchronous with the pivotal movement of the exchange arm 12 is especially effective where applied to tool gripping at a chain type tool magazine 10 in which the position of each tool indexed to the exchange station ES is unstable, such control may be applied also to tool gripping at the tool spindle 20. It is also possible to apply such axial movement control of the gripping plungers 25 and 26 to tool gripping at a disc type tool magazine.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A tool exchanger for exchanging a tool received in a machine tool spindle with another tool held in an exchange station, comprising:
   an exchanger base;
   an arm shaft having an axis carried on said exchanger base for rotational and axial movements;
   an exchange arm fixedly mounted at a middle portion thereof on said arm shaft and extending perpendicularly of said arm shaft, said exchange arm being formed at opposite ends thereof with a pair of semicircular openings for holding said tools;
   first drive means connected to said arm shaft for axially moving said arm shaft to thereby remove at least one of said tools held by said exchange arm from, and insert another one of said tools into, said tool spindle;
   second drive means connected to said arm shaft for rotating said arm shaft to thereby bring one of said tools held by said exchange arm into axial alignment with said tool spindle;
   a pair of gripping plungers received in said exchange arm and adapted for sliding movements in a radial direction of said axis of said arm shaft;
   biasing means interposed between said exchange arm and each of said gripping plungers for urging each of said gripping plungers to respectively extend toward said opposite ends of said exchange arm so as to thereby grip said tools held in said semi-circular openings;
   locking means provided in said exchange arm and movable between first and second positions to respectively permit and inhibit the inward retraction movements of said gripping plungers; and
   plunger control means for retracting at least one of said gripping plungers inwardly of said exchange arm against the force of said biasing means when said locking means is in said first position,
   wherein said plunger control means comprises a control member protruding from each of said gripping plungers; and
   means for operating at least one of said control members to thereby retract said gripping plunger associated therewith inwardly of said exchange arm against the force of said biasing means when said locking means is in said first position.

2. A tool exchanger as set forth in claim 1, wherein said means for operating comprises:
   cam means disposed in a position on the rotational locus that said control members draw upon the rotation of said exchange arm and provided with a guide cam surface for guiding either of said control members for movement to thereby retract one of said gripping plungers associated therewith when said exchange arm is pivoted in one direction toward a tool grip position.

3. A tool exchanger as set forth in claim 2, wherein said cam means comprises:
   a cam lever carried on said exchanger base for pivotal movement about an axis parallel with said arm shaft and formed with said guide cam surface;
   a lever pivoting spring interposed between said exchanger base and said cam lever for urging the same to pivot in one direction; and
   a stop member fixed on said exchanger base and abuttable with said cam lever for holding the same in such an angular position as to present said guide cam surface onto said rotational locus of said control members;
   said cam lever also being formed with an additional cam surface which causes, through the engagement with either of said control members, said cam lever to pivot against the force of said lever pivoting spring for releasing said either of said control members from the guided movement by said guide lever when said exchange arm is pivoted away from said tool grip position in the other direction.

4. A tool exchanger as set forth in claim 2, wherein said cam means comprises:
   a cam plate fixed on said exchanger base, with said guide cam surface being located on said rotational locus of said control members, said cam plate also being formed with an additional cam surface engageable with either of said control members for retracting an associated one of said gripping plungers inwardly of said exchange arm when said exchange arm is pivoted away from said tool grip position in the other direction.

5. A tool exchanger as set forth in claim 3 or 4, wherein said locking means comprises:
   an engaging piece protruding respectively from each of said gripping plungers in an inward direction of said exchange arm;
   a locking plunger received in said exchange arm and axially slidable between said first and second positions in a direction parallel with the axis of said arm shaft, each said locking plunger being formed with a cutout which is alignable with said engaging piece for permitting inward retraction movements of said gripping plunger only when said locking plunger is in said first position, respectively;
   a locking spring interposed between said exchange arm and each of said locking plungers for respectively urging said locking plungers toward said second position; and
   abutting means provided on said exchanger base and abutable with respective one ends of each of said locking plungers for moving the same to said first position when said arm shaft is axially retracted by said first drive means.

6. A tool exchanger for exchanging a tool received in a machine tool spindle with another tool held in an exchange station, comprising:
   an exchanger base;
   an arm shaft having an axis carried on said exchanger base for rotational and axial movements;
   an exchange arm fixedly mounted at a middle portion thereof on said arm shaft and extending perpendicularly of said arm shaft, said exchange arm being formed at opposite ends thereof with a pair of semicircular openings for holding said tools;

first drive means connected to said arm shaft for axially moving said arm shaft to thereby remove at least one of said tools held by said exchange arm from, and insert another one of said tools into, said tool spindle;

second drive means connected to said arm shaft for rotating said arm shaft to thereby bring one of said tools held by said exchange arm into axial alignment with said tool spindle;

a pair of gripping plungers received in said exchange arm and adapted for sliding movements in a radial direction of said axis of said arm shaft;

biasing means interposed between said exchange arm and each of said gripping plungers for urging each of said gripping plungers to respectively extend toward said opposite ends of said exchange arm so as to thereby grip said tools held in said semi-circular openings;

locking means provided in said exchange arm and movable between first and second positions to respectively permit and inhibit the inward retraction movements of said gripping plungers; and plunger control means for retracting at least one of said gripping plungers inwardly of said exchange arm against the force of said biasing means when said locking means is in said first position, wherein said plunger control means comprises a pin member protruding from each of said gripping plungers; and means for operating at least one of said pin members to thereby retract said gripping plunger associated therewith inwardly of said exchange arm against the force of said biasing means when said locking means is in said first position.

* * * * *